(12) United States Patent
Song

(10) Patent No.: US 11,354,021 B2
(45) Date of Patent: Jun. 7, 2022

(54) METHOD, DEVICE, TERMINAL AND STORAGE MEDIUM FOR DISPLAYING ICONS

(71) Applicant: GUANGDONG OPPO MOBILE TELECOMMUNICATIONS CORP., LTD., Guangdong (CN)

(72) Inventor: Fang Song, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/079,366

(22) Filed: Oct. 23, 2020

(65) Prior Publication Data
US 2021/0042013 A1 Feb. 11, 2021

Related U.S. Application Data

(63) Continuation-in-part of application No. PCT/CN2019/087654, filed on May 20, 2019.

(30) Foreign Application Priority Data

Jun. 8, 2018 (CN) .......................... 201810590196.2

(51) Int. Cl.
G06F 3/0482 (2013.01)
G06F 3/04817 (2022.01)
(Continued)

(52) U.S. Cl.
CPC .......... *G06F 3/0482* (2013.01); *G06F 3/0485* (2013.01); *G06F 3/0488* (2013.01); *G06F 3/04817* (2013.01)

(58) Field of Classification Search
CPC .. G06F 3/0485; G06F 3/0482; G06F 3/04817; G06F 3/0488
See application file for complete search history.

(56) References Cited

U.S. PATENT DOCUMENTS 6,538,635 B1 3/2003 Ringot
10,261,672 B1* 4/2019 Dolbakian .......... G06F 3/04817
(Continued)

FOREIGN PATENT DOCUMENTS

CN 101552837 10/2009
CN 102402375 4/2012
(Continued)

OTHER PUBLICATIONS

SIPO, First Office Action for CN Application No. 201810590196.2, dated Feb. 3, 2020.
(Continued)

*Primary Examiner* — Mong-Shune Chung
(74) *Attorney, Agent, or Firm* — Hodgson Russ LLP

(57) ABSTRACT

The embodiments of the present disclosure disclose a method, a device, a terminal, and a storage medium for displaying icons, relating to the field of computer technology. The terminal includes special-shaped screen, the special-shaped screen includes a non-display portion with a special shape and a display portion attached to the non-display portion. The method includes: selecting Q first function icons and (P–Q) second function icons from P function icons; arranging and displaying the Q first function icons along an arc in a first target region of the display portion, wherein the first target region is a display region that is adjacent to an edge of the special-shaped screen or surrounding the non-display portion of the special-shaped scree; and displaying K second function icons in the display portion when an icon display instruction applied to the first target region is detected.

20 Claims, 14 Drawing Sheets

(51) Int. Cl.
*G06F 3/0485* (2022.01)
*G06F 3/0488* (2022.01)

(56) References Cited

U.S. PATENT DOCUMENTS

| | | | | |
|---|---|---|---|---|
| 10,936,148 | B1* | 3/2021 | Merkl | G06F 1/1643 |
| 2013/0145316 | A1* | 6/2013 | Heo | G06F 3/0488 |
| | | | | 715/810 |
| 2014/0075388 | A1* | 3/2014 | Kuscher | G06F 3/04886 |
| | | | | 715/834 |
| 2015/0227308 | A1 | 8/2015 | Kim et al. | |
| 2016/0364089 | A1* | 12/2016 | Blackman | G06F 3/0482 |
| 2017/0147160 | A1 | 5/2017 | Snyder et al. | |
| 2017/0168677 | A1 | 6/2017 | Smits | |
| 2017/0192627 | A1* | 7/2017 | Agnoli | G06F 3/0485 |
| 2018/0121047 | A1 | 5/2018 | Goel et al. | |

FOREIGN PATENT DOCUMENTS

| | | |
|---|---|---|
| CN | 103677530 | 3/2014 |
| CN | 103744582 A | 4/2014 |
| CN | 103838472 | 6/2014 |
| CN | 104636024 A | 5/2015 |
| CN | 105511723 | 4/2016 |
| CN | 105528141 | 4/2016 |
| CN | 105912190 | 8/2016 |
| CN | 106354403 | 1/2017 |
| CN | 106843739 | 6/2017 |
| CN | 107329647 | 11/2017 |
| CN | 107688422 | 2/2018 |
| CN | 108021306 | 5/2018 |
| CN | 108089786 A | 5/2018 |
| CN | 108803965 | 11/2018 |
| WO | 2017109504 | 6/2017 |

OTHER PUBLICATIONS

SIPO, Second Office Action for CN Application No. 201810590196.2, dated Jun. 29, 2020.
WIPO, ISR for PCT/CN2019/087654, Aug. 23, 2019.
SIPO, Office Action issued For CN Application No. 201810590196.2, dated Nov. 3, 2020.
EPO, Extended European Search Report for EP Application No. 19815186.2, dated Jul. 9, 2021.
IPI, Office Action for IN Application No. 202017056889, dated Jan. 4, 2022.

* cited by examiner

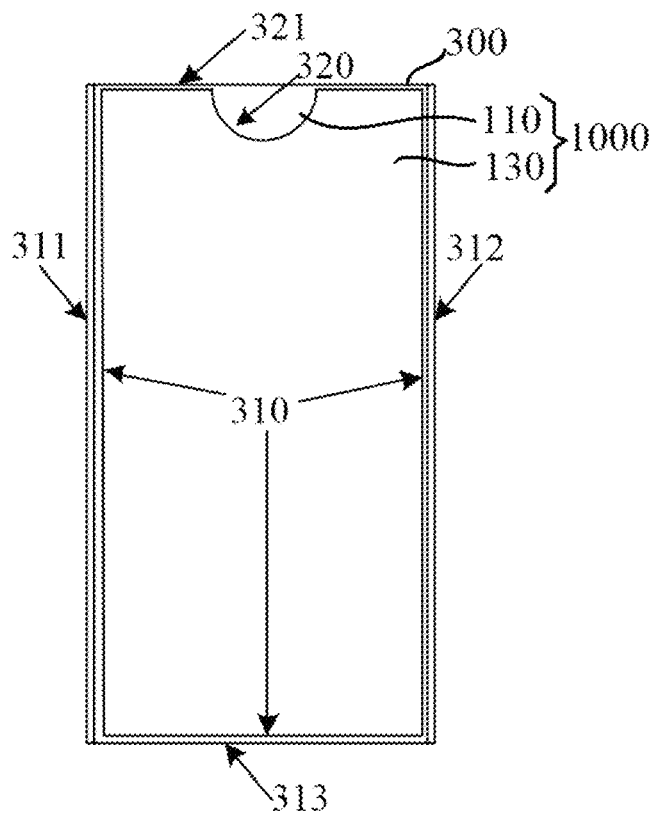

FIG. 20

```
┌─────────────────────────────────────────────────────────┐  2010
│ A first target region in the display portion is determined │
└─────────────────────────────────────────────────────────┘
                            │
                            ▼
┌─────────────────────────────────────────────────────────┐  2020
│ A plurality of first function icons are displayed in the first target │
│ region along an extending direction of the first target region │
└─────────────────────────────────────────────────────────┘
                            │
                            ▼
┌─────────────────────────────────────────────────────────┐  2030
│ A plurality of second function icons is displayed         │
│ in the display portion when an icon display               │
│ instruction applied to the first target region is detected │
└─────────────────────────────────────────────────────────┘
```

FIG. 21

METHOD, DEVICE, TERMINAL AND STORAGE MEDIUM FOR DISPLAYING ICONS

CROSS REFERENCE TO RELATED APPLICATION(S)

This application is a continuation-in-part of International Application No. PCT/CN2019/087654, filed May 20, 2019, which claims priority to Chinese Patent Application No. 201810590196.2, filed Jun. 8, 2018, the entire disclosures of which are incorporated herein by reference.

TECHNIQUE FIELD

The present disclosure relates to the field of computer technologies, and more particularly, to a method, device, terminal, and storage medium for displaying icons.

BACKGROUND

Mobile terminals may implement various functions with different applications.

In the related art, when a user needs to use a specified application in a mobile terminal, the user may search for an activation icon of the specified application on the desktop of the mobile terminal, and the specified application may be activated when the activation icon is clicked.

SUMMARY

The embodiments of the present disclosure provide a method, device, terminal, and storage medium for displaying icons, as follows:

In a first aspect, a method for displaying icons is provided. The method is applied to a terminal comprising a special-shaped screen, the special-shaped screen comprising a special-shaped notch region; the method comprising:

determining Q first function icons and (P−Q) second function icons each included in P function icons, wherein Q is a preset positive integer, and P is an integer greater than Q;

arranging and displaying the Q first function icons along an arc in a first target region, wherein the first target region is a display region adjacent to an edge of the special-shaped screen or surrounding the special-shaped notch region of the special-shaped screen; and displaying K second function icons in a current user interface when an icon display instruction applied to the first target region is detected, where K is an integer not greater than (P−Q).

In a second aspect, a device for displaying icons are provided. The device is applied to a terminal comprising a special-shaped screen. The special-shaped screen includes a special-shaped notch region; the device includes: an icon determining module, configured to determine Q first function icons and (P−Q) second function icons each included in P function icons; wherein Q is a preset positive integer, and P is an integer greater than Q; a first icon display module, configured to arrange and display the Q first function icons along an arc in a first target region; the first target region being a display region attached to an edge of the special-shaped screen or surrounding the special-shaped notch region; and a second icon display module, configured to display K second function icons in a current user interface when an icon display instruction applied to the first target region being detected, wherein K is an integer not greater than (P−Q).

In a third aspect, a terminal is provided. The terminal included a processor and a memory. The memory stores and at least one instruction, and the instruction is loaded and executed by the processor to perform the above method for displaying icons.

In a fourth aspect, a computer-readable storage medium is provided. The storage medium stores at least one instruction, and the instruction is loaded and executed by a processor to perform the above method for displaying icons.

In a fifth aspect, still another method for displaying icons is provided. In the method, a first target region in the display portion is determined. The first target region is attached to an edge of the display portion or around the non-display portion. The first target region is in an arc shape extending along an arc. A plurality of first function icons are displayed in the first target region along an extending direction of the first target region. A plurality of second function icons is displayed in the display portion when an icon display instruction applied to the first target region is detected. The second function icons are different from the first function icons.

BRIEF DESCRIPTION OF THE DRAWINGS

The above and/or additional aspects and advantages of the present disclosure will become apparent and easily understood from the description of the embodiments in conjunction with the following drawings, in which:

FIG. 20 illustrates till another terminal, in accordance with one embodiment of the present disclosure.

FIG. 21 illustrates till another method for displaying icons, in accordance with one embodiment of the present disclosure.

DETAILED DESCRIPTION OF PREFERRED EMBODIMENTS

Figure 1:
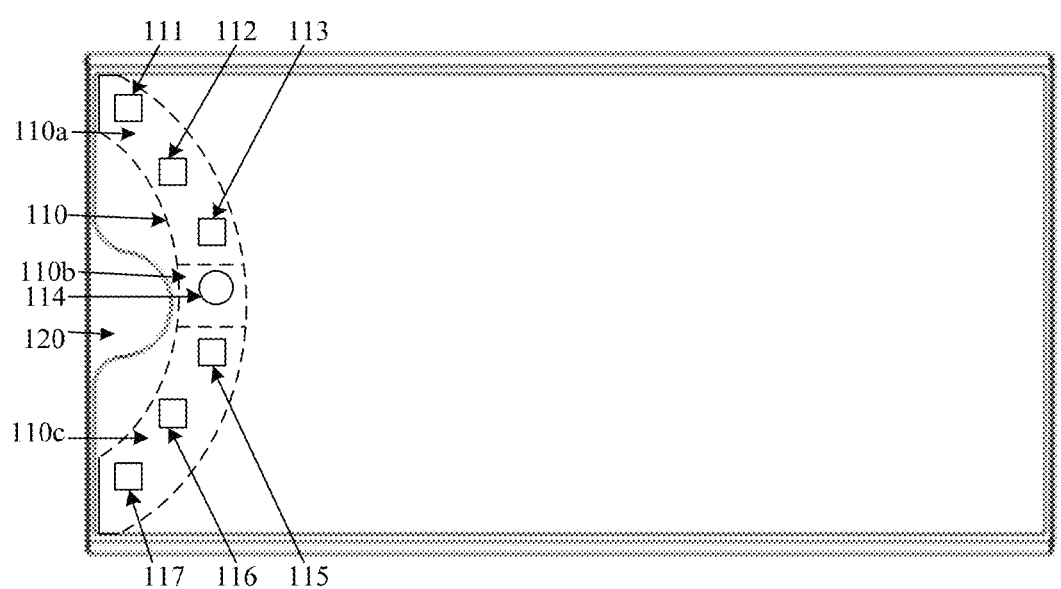
FIG. 1 illustrates a schematic view of a display mode of a first arc-shaped display region, in accordance with an embodiment of present disclosure.

In order to facilitate the understanding of the present disclosure, the present disclosure will be described more fully hereinafter with reference to the accompanying drawings. Several embodiments of the present disclosure are presented in the drawings. However, the disclosure may be embodied in many different forms and is not limited to the embodiments described herein. Rather, these embodiments are provided so that this disclosure will be thorough and comprehensive.

In the technical solution of prior art, when there are a large number of activation icons for activate applications on the desktop of a mobile terminal, an operation for the user to find an activation icon of a specified application is relatively complex. Moreover, when it needs to activate a specified application via the terminal in an urgency, the specified application can not be quickly activated because of the complex operation.

When methods provided by the embodiments of the present disclosure is executed, it can be applied to a terminal with a special-shaped screen. The special-shaped screen defines a special-shaped notch region. The terminal is configured to determine Q first function icons and P to Q second function icons among P function icons, where Q is a positive integer in a preset value, and P is an integer greater than Q. The Q first function icons are displayed in an arc arrangement in a target region, and the target region is a display region that is attached to an edge of the special-shaped screen or surrounds the special-shaped notch region. When an icon display instruction applied to the target region is detected, K second function icons are displayed in a current user interface, and K is an integer not greater than (P–Q). It should be noted that, the terms (P–Q) in the description is a value of the difference between P and Q, that is, (P–Q) is P minus Q. Because this method is applied to the terminal with the special-shaped screen, when there are many function icons displayed on the edge of the terminal screen in the arc arrangement, the terminal can display the originally hidden function icons in the user interface for reposing to the action of the icon display instruction, which enables the user to activate the specified application through the function icon. Operations for to search for the icon of the specified application may be simplified, a speed at which the terminal displays the function icon of the specified application may be increased, an efficiency of activating the specified application is therefore improved.

In order to facilitate the understanding of the solutions illustrated in the embodiments of the present disclosure, several terms appearing in the embodiments of the present disclosure will be introduced below.

A first target region: refers to a display region that attached to the edge of the special-shaped screen or surrounds the special-shaped notch region in the special-shaped screen. In a possible implementation manner, the first target region may be transparent in a display layer. In another possible implementation manner, the first target region may also be colored in the display layer. Alternatively, the icon display instruction may be applied on the first target region. In a possible implementation manner, the first target region may have first arc-shaped. In another possible implementation manner, the first target region may also be a rectangular region. In other possible implementation manners, the first target region may also be a region in other shapes, which is not limited in the embodiment of the present disclosure. It should be noted that, for the sake of understanding, the following takes the target region having the first arc-shaped as an example.

A first arc-shaped display bar: refers to a display region having an arc-shaped in the special-shaped screen. The first arc-shaped display bar is configured to display function icons. For example, an icon of application A is displayed in the first arc-shaped display bar, and the icon of application A is a function icon.

Alternatively, the first arc-shaped bar is an arc-shaped display region surrounding the special-shaped notch region of the special-shaped screen.

As illustrated in FIG. 1, FIG. 1 illustrates a schematic view of a display mode of the first arc-shaped bar, in accordance with an embodiment of present disclosure. The first arc-shaped display bar 110 is displayed around the special-shaped notch region 120. Icons of a first application is displayed in the first arc-shaped display bar 110. The icons of the first application may include at least one of a function icon 111, a function icon 112, a function icon 113, a function icon 114, a function icon 115, a function icon 116, and a function icon 117.

Alternatively, there may be one or at least two first arc-shaped display bar 110. The number of the first arc-shaped display bar is not limited in the embodiments of the present disclosure.

Alternatively, the first arc-shaped display bar 110 may be divided into several sub-regions. Each one of the sub-regions can be individually displayed in the user interface in response to a corresponding trigger gesture. The following possible implementations may illustrate the details.

In a possible implementation manner, the first arc-shaped display bar 110 may be divided into three sub-regions including a first sub-region, a second sub-region, and a third sub-region. The function icon 111, the function icon 112, and the function icon 113 are displayed in the first sub-region 110a. The function icon 114 is displayed in the second sub-region 110b. The function icon 115, the function icon 116, and the function icon 117 are displayed in the third sub-region 110c.

Figure 2:
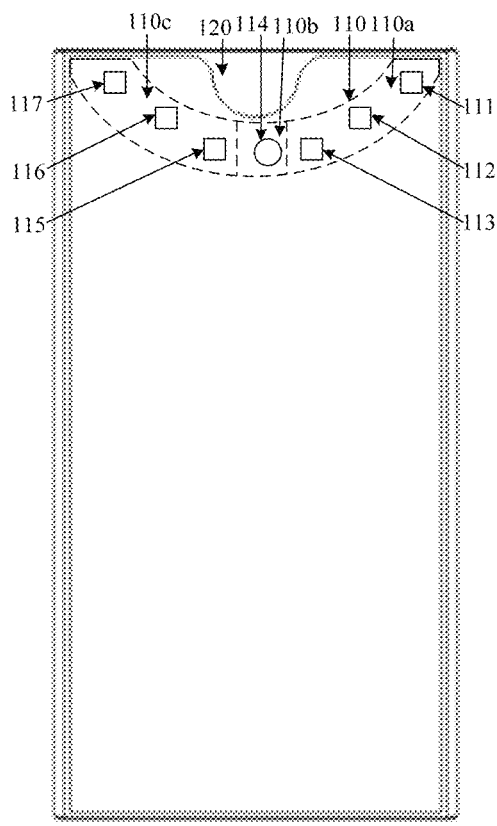
FIG. 2 illustrates a schematic view of another display mode of the first arc-shaped display region, in accordance with an embodiment of present disclosure.

Alternatively, the first arc-shaped display bar may be triggered when the terminal is in a horizontal display state, or when the terminal is in a vertical display state. For example, as illustrated in FIG. 1, the first arc-shaped display bar may be triggered to display on the special-shaped screen when the terminal is in a horizontal display state. As illustrated in FIG. 2, FIG. 2 illustrates a schematic view of another display mode of the first arc-shaped display region, in accordance with an embodiment of present disclosure. In FIG. 2, the first arc-shaped bar is triggered to display when the terminal is in the vertical display state.

A Function icon: refers to a virtual icon displayed in the first arc-shaped display bar. Alternatively, the function icon may be an activation icon of an in-system application or a third-party application. Alternatively, the function icon may also be an activation icon of a system service or a system process.

Alternatively, when the function icon is the activation icon of the in-system application, the in-system application may include at least one in-system applications selected from a group of an address book application, a short message application, a phone application, a weather application, a date application, a clock application, a camera application, a gallery application, a browser application, a calculator application, a voice recorder application, a compass application, a flashlight application, a file management application, an application management application, and a setting application.

Alternatively, when the function icon is the activation icon of the third-party application, the third-party application may include at least one third-party applications selected from a group of a game application, a social chat application, a browser application, a book reading application, a music application, a video application, a live broadcast application, and a short video application, a shopping application, payment and wealth management applications, an image beautification application, a smart device management application, a weather application, a map navigation application, a text editing application, a shared transportation application, a takeaway application, a ticket booking application, a taxi application, an attendance check-in application, a recruitment application, a resource download application, an email application, a news information application, and a scanning code application.

Alternatively, when the function icon is the activation icon of the system service or the activation icon of the system process, the system service may include at least one system services selected from a group of a wireless LAN switching on/off service, a Bluetooth function switching on/off service, a mobile data function switching on/off service, a ring mode switching service, an automatic rotation service for witching the horizontal and vertical display stated, a flight mode switching on/off service, a location information switching on/off service, a screen recording service, an eye protection mode switching on/off service, an screenshot service, a Do Not Disturb (DND) switching on/off service, a power saving mode switching on/off service, and an Near Field Communication (NFC) switching on/off services.

A function icon, refers to a specified function icon that is required to be displayed in the first target region or the second target region. The second target region can be implemented as a second arc-shaped display bar. Alternatively, there may be P the function icons, and P is a positive integer.

A first function icon: refers to a function icon displayed in the first arc-shaped display bar when the first arc-shaped display bar is displayed, for responding to an initially trigger, as an initially display. Alternatively, there may be Q the first function icons, and Q is a positive integer, and P is greater than Q.

In a possible implementation manner, the initially display may refer to a first time for the first arc-shaped display bar to display when the terminal executes a specified instruction. For example, the initially display may be a first time for the first arc-shaped display bar to display after the mobile terminal is powered on, or it may be the first time for the first arc-shaped display bar to display after the mobile terminal is unlocked.

In another possible implementation manner, the initial display may be a first time for the first arc-shaped display bar to display in a period predetermined by the mobile terminal. For example, when the period lasts one day, the initial display may be the first time for the first arc-shaped display bar to display in each day. For another example, when the period lasts three days, the initial display may be the first time for the first arc-shaped display bar to display every three days.

A second function icon: refers to the function icon that is not displayed when the first arc-shaped display bar is in the first display. That is, second function icons may refer to the icons excepting the first function icon among all of the function icons. Alternatively, when the number of function icons is P and the number of first function icons is Q, the number of second function icons is equal to (P–Q).

In a possible scenario, when the first arc-shaped display bar can display 7 function icons at the same time when expanded, and when there are 15 function icons, the value of P is 15, and the value of Q is 7. P minus Q (P–Q) is 8. That is, the number of the first function icon is 7, and the number of the second function icon is 8.

An icon display instruction, refers to a computer program instruction that apply to the target region and is configured to instruct the terminal to display K second function icons. Alternatively, the icon display instruction is an instruction generated by the terminal when the terminal receives a specified operation applied by the user. In a possible implementation manner, there may be K second function icons and Q first function icons displaying on the screen simultaneously. In another possible implementation manner, the K first function icons of the Q first function icons may be hidden by the terminal when the K second function icons are displayed.

An extended display instruction, is one of the icon display instructions, and is configured to instruct the terminal to display K second function icons and Q first function icons in one user interface.

A replacement instruction: is one of the icon display instructions, and is configured to instruct the terminal to replace the K first function icons of the Q first function icons with K second function icons, and display the K second function icons.

Exemplarily, the method for displaying icons provided in the embodiments of the present disclosure can be applied to a terminal including a special-shaped screen. It should be noted that this method for displaying icons can also be applied to terminals with a screen such as a full-screen, a foldable screen, a doubled screen, a curved surface screen, or a flexible screen, which is mot limited in embodiments of the present disclosure.

Figure 3:
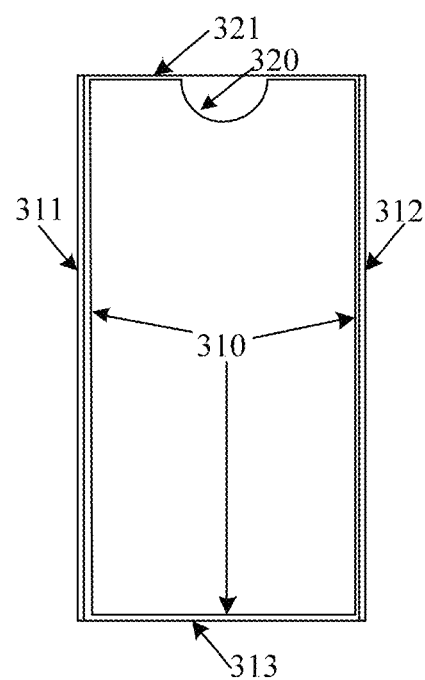
FIG. 3 to FIG. 7 illustrate schematic views of five possible forms of a special-shaped screen, in accordance with an embodiment of present disclosure.
Figure 4:
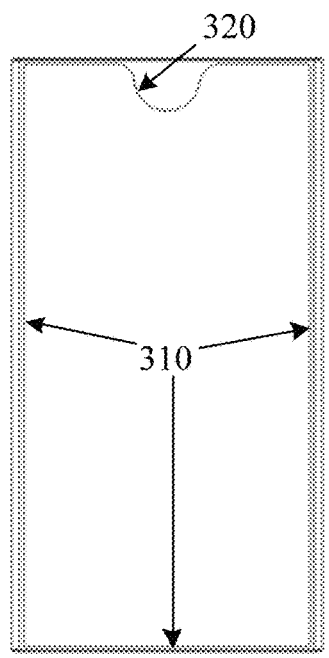
Figure 5:
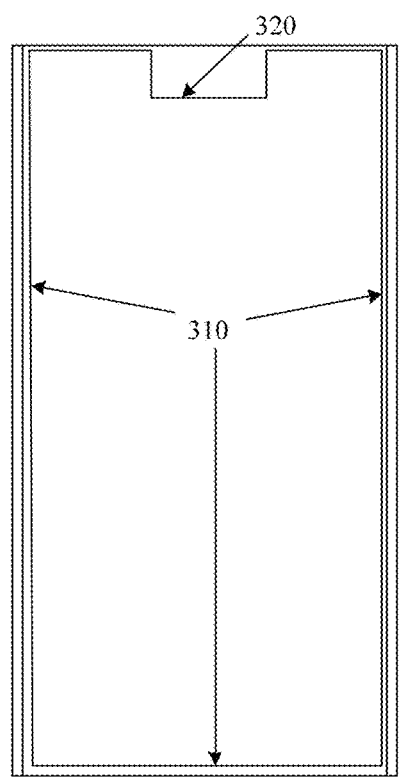
Figure 6:
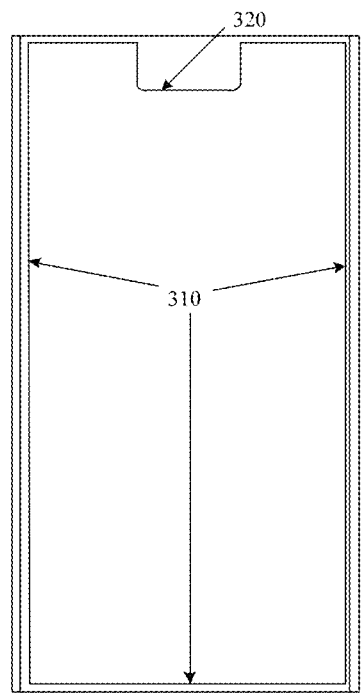
Figure 7:
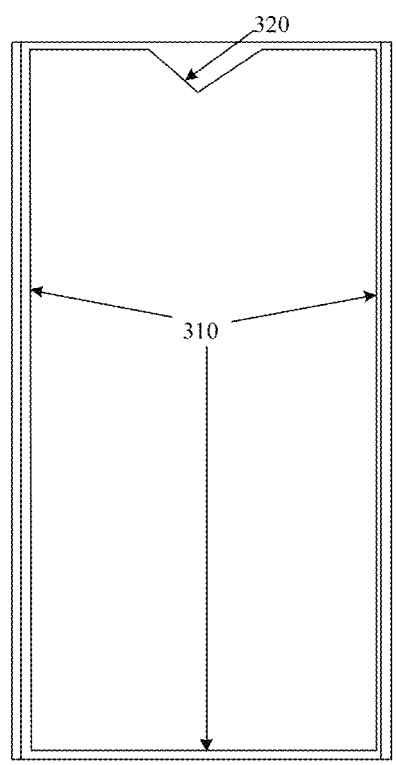

The terminal includes the special-shaped screen and an outer frame, in accordance with an embodiment of present disclosure. The outer frame may include two first edges and two second edges. Two first edges are substantially parallel to each other, and two second edges are substantially parallel to each other. The special-shaped screen includes a concave sub-edge and three straight sub-edges. The concave sub-edge is attached to one of the first edges. Two of the three straight sub-edges are connected to the concave sub-edge, and substantially parallel to each other. The two of the three straight sub-edges are respectively attached to the two second edges. The other of the three straight sub-edges is attached to another one of the first edges. A length of the first edge is not larger than that of the second edge. The concave sub-edge and the outer frame of the terminal cooperatively define a special-shaped notch region. The special-shaped notch region is configured to accommodate a sensor in a front case of the terminal. The concave sub-edge can include a concave portion defined by a poly line or a curve line. For example, as illustrated in FIG. 3 to FIG. 7, FIG. 3 to FIG. 7 illustrate schematic views of five possible forms of a special-shaped screen. In the various forms illustrated above, the straight sub-edge 310 may be a rounded straight-line segment or a straight-line segment. The concave sub-edge 320 can have any one of the forms in the five possible forms as illustrated in FIGS. 3 to 7. In FIG. 3, the concave sub-edge 320 is an edge with a semicircular notch. In FIG. 4, the concave sub-edge 320 is an edge with an arc-shaped notch. In FIG. 5, the concave sub-edge 320 is an edge with a rectangular notch. In FIG. 6, the concave sub-edge 320 is an edge with a rounded rectangular notch. In FIG. 7, the concave sub-edge 320 is an edge with a triangular notch. It should be noted that the specific shape of the special-shaped screen is not limited in the embodiments of the present disclosure. The above five forms are part of the appearance of the special-shaped screen of terminal to which the solution of the present disclosure can be applied.

Alternatively, taking FIG. 3 as an example, the outer frame of the terminal includes two first edges 321, 313, and two second edges 311, 312. The first edge 321 are attached to the concave sub-edge. The two second edges 311, 312 are respectively attached to the two straight sub-edges that are connecting to the concave sub-edge. Alternatively, the first edge 313 is parallel to the first edge 312.

Alternatively, the terminal may be selected from a group of a mobile phone, a tablet computer, a smart glass, a smart watch, a digital camera, an MP4 playback terminal, an MP5 playback terminal, a learning machine, a dot reading machine, an electronic paper book, an electronic dictionary, a virtual reality (VR) play terminal, or an augmented reality (AR) play terminal, etc.

Figure 8:
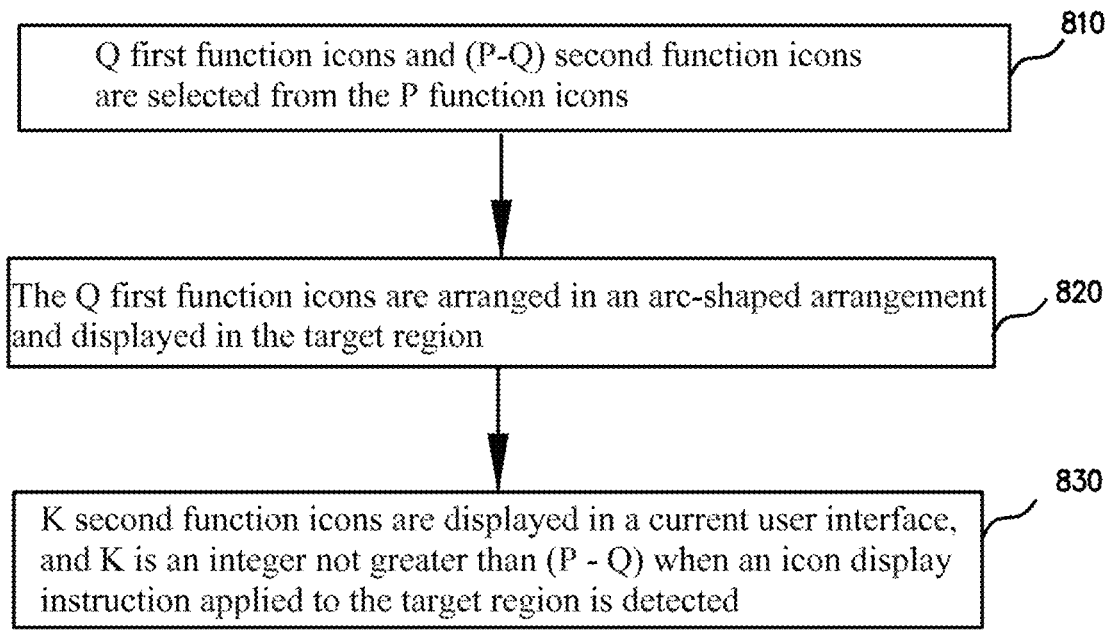
FIG. 8 illustrates a schematic flowchart of a method for displaying icons, in accordance with an embodiment of present disclosure.

As illustrated in FIG. 8, FIG. 8 illustrates a schematic flowchart of a method for displaying icons, in accordance with an embodiment of present disclosure. The method for displaying icons can be applied to the above-mentioned terminal with the special-shaped screen. In FIG. 8, the method for displaying icons may begin at block 810.

At block 810, Q first function icons and (P−Q) second function icons are selected from the P function icons. Q is a preset positive integer, and P is an integer greater than Q.

In the embodiments of the present disclosure, in a possible implementation manner, the terminal can determine the value of P as the amount of the function icons according to a configuration of the user.

In another possible implementation manner, the terminal can release setting permissions of the function icons to allow the user to independently select the function icons that need to be displayed in the target region.

In another possible implementation manner, the terminal can also lock a certain number of function icons while release the setting permissions of other function icons.

For example, in a possible implementation manner, take the display manner illustrated in FIG. 1 as an example, the user can determine whether the seven function icons including the function icon 111, the function icon 112, the function icon 113, the function icon 114, the function icon 115, the function icon 116, and the function icon 117 are displayed in the target region.

In another possible implementation manner, the terminal may lock a certain number of first function icons in advance, and release the setting permissions of other first function icons. For example, the terminal may lock the function icon 114 to allow the user to determine whether the function icon 111, the function icon 112, the function icon 113, the function icon 115, the function icon 116, and the function icon 117 are to be displayed in the target region. For another example, the terminal can also lock the function icon 111, the function icon 112, the function icon 113, and the function icon 114, and directly determine the above four function icons as function icons to be displayed in the target region. The user only determine whether other icons of other applications are used as function icons. When the user select 5 function icons as function icons, the number of function icons is 9.

In a possible implementation manner, the terminal determines the first Q function icons as the first function icons, and determines the (Q+1)th to the Pth function icons as the (P−Q) second function icons, according to an order of the P function icons in the terminal.

Alternatively, the order may be a time sequence in which the activation icons of the applications are determined as the function icon chronologically. For example, a function icon A was determined as a function icon at 21:29:37 on Sep. 3, 2016, while a function icon B was determined as a function icon was 08:47:20 on Oct. 4, 2016, the order of the function icon A is arranged before the function icon B.

Alternatively, the order may also be an order of times that the function icons have been involved in history, which is ordering from more to less.

Alternatively, the order may also be the sequence of time intervals between the last times that the function icons was involved and a present moment of the terminal, which is ordering from short to long.

At block 820, the Q first function icons are arranged in an arc-shaped arrangement and displayed in the target region. The target region is a display region that is adjacent to the edge of the special-shaped screen or surrounds the special-shaped notch region.

In the embodiments of the present disclosure, the terminal can arrange Q first function icons in an arc-shaped arrangement and display the Q first function icons in the target region. In a possible manner, the terminal may arrange Q first function icons in an arc-shaped arrangement and display the Q first function icons at a region attached to the edge of the special-shaped screen. In another possible manner, the terminal may arrange Q first function icons in an arc-shaped arrangement and display the Q first function icons at a region around the special-shaped notch region.

At block 830, K second function icons are displayed in a current user interface, and K is an integer not greater than (P−Q) when an icon display instruction applied to the target region is detected.

In the embodiments of the present disclosure, the terminal may display the K second function icons in the current user interface when the terminal detects an icon display instruction applied to the target region, a K is an integer not greater than (P−Q).

In a possible implementation manner, the K second function icons and the Q first function icons are simultaneously displayed in current user interface.

In another possible implementation manner, the K second function icons will replace K first function icons of the Q first function icons and be displayed.

In summary, the method for displaying icons provided in this embodiment can be applied to the terminal with the special-shaped screen. The special-shaped screen includes a special-shaped notch region. The terminal selects Q first function icons and (P−Q) second function icons from the P function icons. Q is a preset positive integer, and P is an integer greater than Q. The Q first function icons are displayed in the target region and arranged in an arc-shaped arrangement. The target region is a display region that is adjacent to the edge of the special-shaped screen or surrounds the special-shaped notch region. When an icon display instruction applied to the target region is detected, K second function icons are displayed in a current user interface, and K is an integer not greater than (P−Q).

Because this method is applied to the terminal with the special-shaped screen, when there are many function icons displayed on the edge of the terminal screen in the arc arrangement, the terminal can display the originally hidden function icons in the user interface for reposing to the action of the icon display instruction, which enables the user to activate the specified application through the function icon. Operations for to search for the icon of the specified application may be simplified, a speed at which the terminal displays the function icon of the specified application may be increased, an efficiency of activating the specified application is therefore improved.

Based on the previous embodiment, the terminal can display the second function icons in a scrolling visual manner, as illustrated in the following embodiment.

Figure 9:
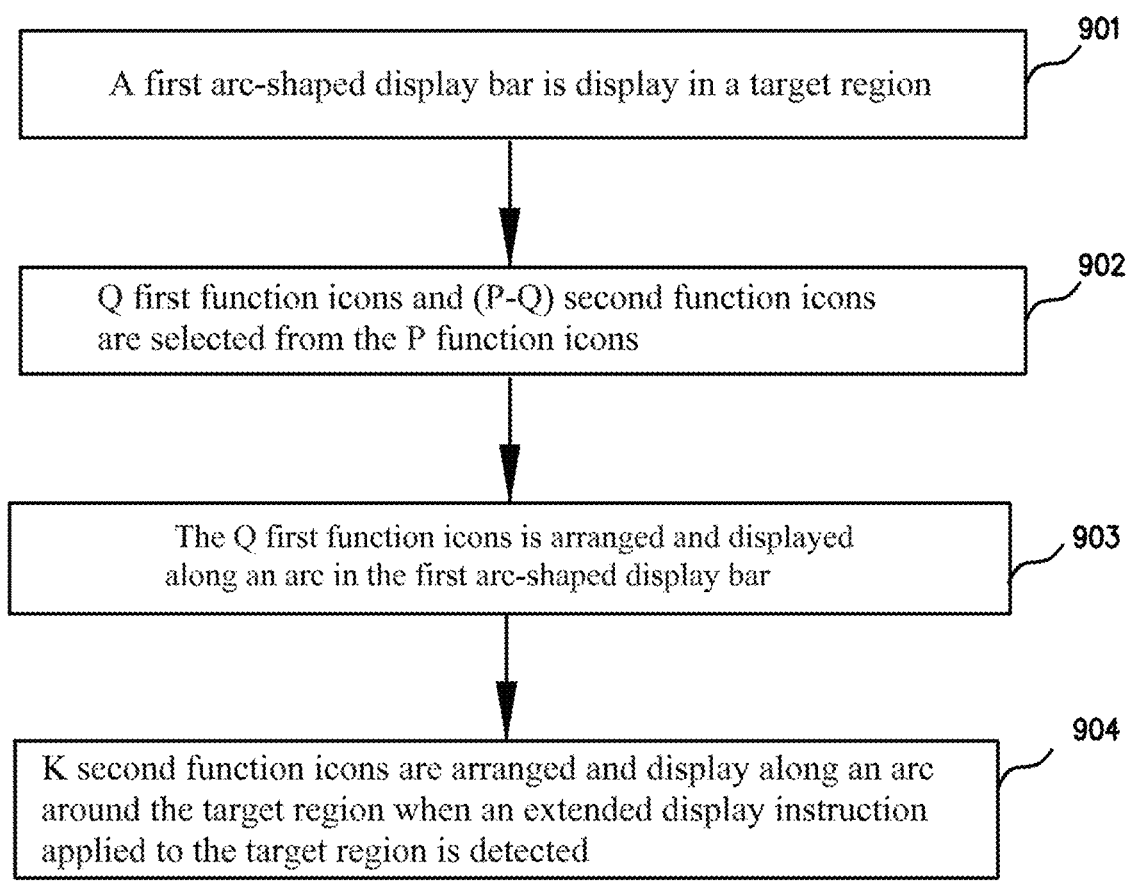
FIG. 9 illustrates a schematic flowchart of a method for displaying icons, in accordance with another embodiment of present disclosure.

As illustrated in FIG. 9, FIG. 9 illustrates a schematic flowchart of a method for displaying icons, in accordance with another embodiment of present disclosure. This method for displaying icons can be applied to any one of the terminals illustrated in FIGS. 1 to 7. In FIG. 9, the method for displaying icons may begin at block 810.

At block 901, a first arc-shaped display bar is display in a target region.

In the embodiment of the present disclosure, the terminal can display the first arc-shaped display bar in the target region. The first arc-shaped display bar can be displayed in a region adjacent to an edge of the special-shaped screen, or around the special-shaped notch region of the special-shaped screen.

In the embodiments of the present disclosure, the terminal may display the first arc-shaped display bar in a region around the special-shaped notch region. In a possible implementation manner, for example, the terminal may display the first arc-shaped display bar 110 in the manner illustrated in FIG. 1 and FIG. 2. In another possible implementation manner, the terminal may also display the first arc-shaped display bar in a region adjacent to an edge other than the edge in which the special-shaped notch region defined. Taking FIG. 3 as an example, the terminal may also display the first arc-shaped display bar in a region adjacent to the straight-line sub-edge 310. For example, the terminal may display the first arc-shaped display bar in a region adjacent to the straight-line sub-edge 311, the straight-line sub-edge 312, or the straight-line sub-edge 313. Function icons are displayed in the first arc-shaped display bar.

Alternatively, when the function icon is an activation icon of a screen recording service and the function icon is triggered, the terminal will involve the screen recording service.

Alternatively, when the function icon is an activation icon of a screen recording service and the function icon is triggered, the terminal will capture a screenshot of the current user interface. In a possible implementation manner, the terminal will capture image layers excepting an image layers that is configured to display the first arc-shaped display bar, and superimpose and fuse the images displayed on the captured image layers, and generate a final screenshot image.

At block 902, Q first function icons and (P−Q) second function icons each included in the P function icons are selected from the P function icons.

It should be noted that the operation in block 902 is identical to the operation in block 810, which will not be repeated here.

At block 903, the Q first function icons is arranged and displayed along an arc in the first arc-shaped display bar.

The Q first function icons is arranged in an arc-shaped arrangement dans displayed in the first arc-shaped display bar.

In the embodiment of the present disclosure, the terminal may arrange the Q first function icons in an arc-shaped arrangement, and display the Q first function icons in the first arc-shaped display bar column.

In at block 904, K second function icons are arranged and display along an arc around the target region when an extended display instruction applied to the target region is detected.

In the embodiment of the present disclosure, K is an integer not greater than (P−Q).

Alternatively, as an alternative implementation of block 904, the terminal can replace block 904 by performing operations of sub-block (1) and sub-block (2).

At sub-block (1), a second target region is determined when an extended display instruction applied to the first arc-shaped display bar is detected, the second target region is determined based on an edge of the first target region that is adjacent to a center of the screen. The second target region is attached to the first target region.

In the embodiment of the present disclosure, when the terminal detects the expanded display instruction applied to the first arc-shaped display bar, it determines the second target region based on the edge of the first arc-shaped display bar that is adjacent to the center of the screen. The second target region may be a second arc-shaped display bar.

For example, when a length of an edge of the first arc-shaped display bar is L1, may be determined according to the length L1 of the edge of the first arc-shaped display bar.

At sub-block (2), K second function icons are displayed in the second target region.

In the embodiment of the present disclosure, the second target region may be a second arc-shaped display bar. The terminal can display the K second function icons in the second arc-shaped display bar. Alternatively, an order of the K second function icons can be manually adjusted by the user. Alternatively, the order of the K second function icons may also be predetermined in advance.

It should be noted that the second arc-shaped display bar can be display in a different shapes corresponding to different expansion display instructions, which will be described in the following, taking a first display mode, a second display mode, and a third display mode as examples.

The first display mode: in this display mode, the first arc-shaped display bar includes at least two sub-regions. Taking the first arc-shaped display bar 110 illustrated in FIG. 1 as an example, the first arc-shaped display bar 110 of the terminal can be divided into three sub-regions including a first sub-region 110a, a second sub-region 110b, and a third sub-region 110c.

In this display mode, the second target region is determined based on an edge of a target sub-region adjacent to the center of the screen when the extended display instruction applied to the target sub-region is detected. The target sub-region is one of the at least two sub-regions. Alternatively, the second target region may be a second arc-shaped display bar.

Alternatively, the terminal may separately display at least one of the above three sub-regions. A displayed sub-regions, or a displayed combination of multiple sub-regions is considered as the target sub-regions. For example, the terminal may display only one of the first sub-region 110a, the second sub-region 110b, or the third sub-region 110c. For another example, the terminal may also display two of the first sub-region 110a, the second sub-region 110b, and the third sub-region 110c.

In a possible application manner, in order to enhance the user's visual effect, the terminal may display the two sub-regions adjacent to each other at the same time. For example, the terminal may display the first sub-region 110a and the second sub-region 110b at the same time, or display the second sub-region 110b and the third sub-region 110c at the same time.

Figure 10:
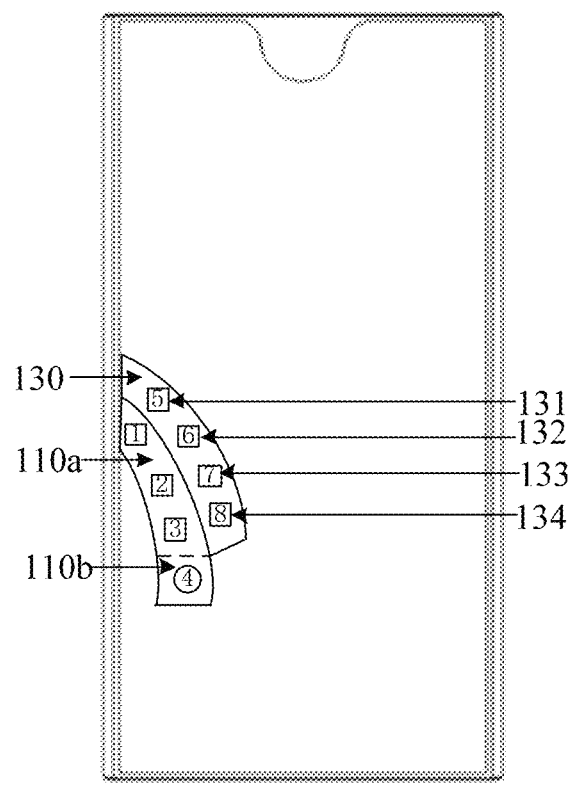
FIG. 10 illustrates a schematic view of an operation of displaying a second function icon in the method of FIG. 9.

As illustrated in FIG. 10, FIG. 10 illustrates a schematic view of an operation of displaying a second function icon in the method of FIG. 9. In FIG. 10, the terminal displays the first sub-region 110a and the second sub-region 110b of the first arc-shaped display bar. When the terminal detects the expanded display instruction applied to the first arc-shaped display bar, the terminal will display the second arc-shaped display bar 130 in a region attached to an edge of the first arc-shaped display bar that is adjacent to the center of the screen. The terminal will display the K second function icons in the second arc-shaped display bar 130 when the second arc-shaped display bar 130 is displayed. In FIG. 10, K equals to 4, and the K second function icons include 4 second function icons including a function icon 131, a function icon 132, a function icon 133, and a function icon 134.

The display mode 2, in this display mode, the first arc-shaped display bar also includes at least two sub-regions. Taking the first arc-shaped display bar 110 illustrated in FIG. 1 as an example, the first arc-shaped display bar 110 of the terminal can be divided into three sub-regions including a first sub-region 110a, a second sub-region 110b, and a third sub-region 110c.

In this display mode, the terminal will display the first sub-region 110a, the second sub-region 110b, and the third sub-region 110c at a same time. When the terminal detects the extended display instruction that apply to the first arc-shaped display bar, the terminal will determine which sub-region the extended display instruction is applied to. After determining the sub-region to which the extended display instruction is applied, the second arc-shaped display bar will be displayed next to the sub-region to which the extended display instruction is applied. A length of an edge of the second arc-shaped display bar is equal to that of an edge of the said sub-region that id adjacent to the center of the screen.

Figure 11:
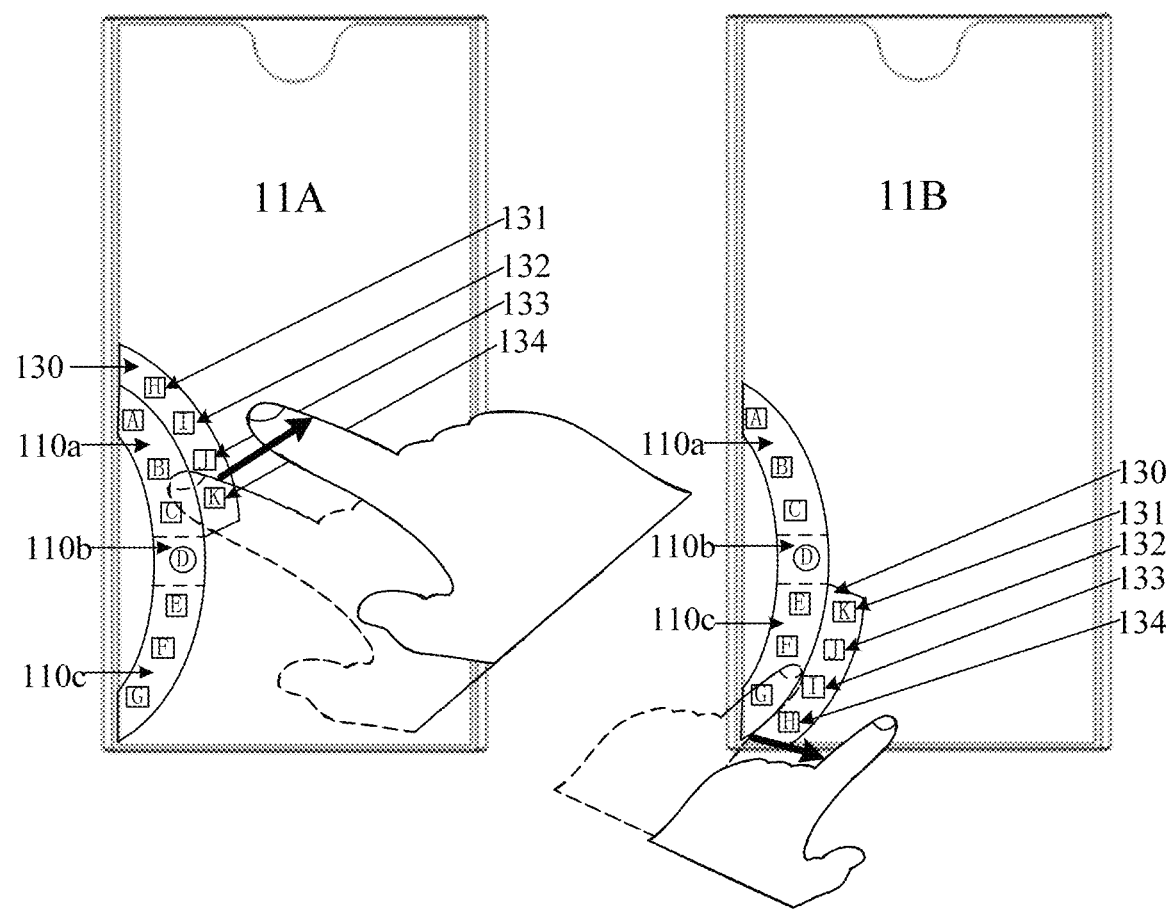
FIG. 11 illustrates another schematic view of the operation of displaying a second function icon in the method of FIG. 9.

As illustrated in FIG. 11, FIG. 11 illustrates another schematic view of the operation of displaying a second function icon in the method of FIG. 9 In FIG. 11, the terminal displays a first arc-shaped display bar 110. The first arc-shaped display bar 110 includes a first sub-region 110a, a second sub-region 110b, and a third sub-region 110c. When the terminal detects the extended display instruction, the terminal will determine the display position and size of the second arc-shaped display bar according to the specific position to where the extended display instruction is applied.

For example, in the user interface 11A, when the terminal detects that the extended display instruction (an instruction generated according to a sliding operation into the screen of the user) is applies to the first sub-region 110a, the terminal will display the second arc-shaped display bar 130 basing on the edge of the first sub-region 110a adjacent to the center of the screen. The terminal will display K second function icons in the second arc-shaped display bar 130 after the second arc-shaped display bar 130 is displayed. In the user interface 11A, K equals to 4, the K second function icons include 4 second function icons including a function icon 131, a function icon 132, a function icon 133, and a function icon 134.

For another example, in the user interface 11B, when the terminal detects that the extended display instruction (an instruction generated according to a sliding operation into the screen of the user) applies to the third sub-region 110c, the terminal will display the second arc-shaped display bar 130 basing on the edge of the third sub-region 110c adjacent to the center of the screen. The terminal will display K second function icons in the second arc-shaped display bar 130 after the second arc-shaped display bar 130 is displayed. In the user interface 11B, K equals to 4, the K second function icons include 4 second function icons including a function icon 131, a function icon 132, a function icon 133, and a function icon 134.

The display mode 3: in this display mode, the first arc-shaped display bar also includes at least two sub-regions. Taking the first arc-shaped display bar 110 illustrated in FIG. 1 as an example, the first arc-shaped display bar 110 of the terminal can be divided into three sub-regions including a first sub-region 110a, a second sub-region 110b, and a third sub-region 110c.

In this display mode, the terminal will display the first sub-region 110a, the second sub-region 110b, and the third sub-region 110c at a same time. When the terminal detects an expanded display instruction applied to the first arc-shaped display bar, the terminal will directly display the second arc-shaped display bar 130 based on the edge of the entire of the first arc-shaped display bar adjacent to the center of the screen. After the second arc-shaped display bar 130 is displayed, the terminal will display K second function icons in the second arc-shaped display bar.

Figure 12:
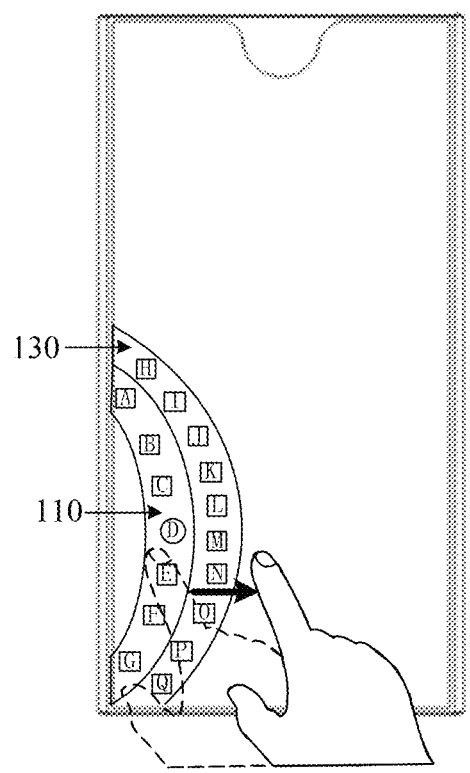
FIG. 12 illustrates still another schematic view of the operation of displaying a second function icon in the method of FIG. 9.

As illustrated in FIG. 12, FIG. 12 illustrates still another schematic view of the operation of displaying a second function icon in the method of FIG. 9. In FIG. 12, the terminal displays a first arc-shaped display bar 110. When the terminal detects the expanded display instruction, the terminal will display the second arc-shaped display bar 130 based on the edge of the first arc-shaped display bar 110 adjacent to the center of the screen. After the second arc-shaped display bar 130 is displayed, the terminal will display K second function icons in the second arc-shaped display bar 130. Alternatively, K may equal to 10 in the embodiment illustrated in FIG. 12.

It should be noted that the sizes of the second arc-shaped bars in the above-mentioned first display mode, the second display mode, and the third display mode are different from each other, the number K of the second function icons that the terminal can display in the display modes will also be different from each other. For example, in the first display mode or the second display mode, three second function icons is displayed in the second arc-shaped display bar. In the third display mode, seven second function icons can be displayed in the second arc-shaped display bar.

In summary, in the method for displaying icons, in accordance with this embodiment discloses, By displaying a first arc-shaped display bar in the target region, Q first function icons and (P−Q) second functions icons are selected from the P function icons. The Q first function icons are arranged in an arc-shaped arrangement and displayed in the first arc-shaped display bar. When the extended display instruction applied to the target region is detected, K second function icons are arranged in an arc-shaped arrangement around the target region and displayed. It can be seen that, in the method, by displaying the second function icons while displaying the first function icons, the function icons configurated by the user may be quickly and completely displayed. When the user needs to involve the function icons in the first arc-shaped display bar and the function icons in the second arc-shaped display bar in sequence in a short time, operations for the user to switch different interfaces are simplified, and an efficiency of the user using the first function icons and the second function icons at the same time is improved.

Based on the above embodiments, the embodiment of the present disclosure also provides a method for displaying icons. In the method, the second function icons may be displayed in a scroll manner, as illustrated in the following embodiments.

Figure 13:
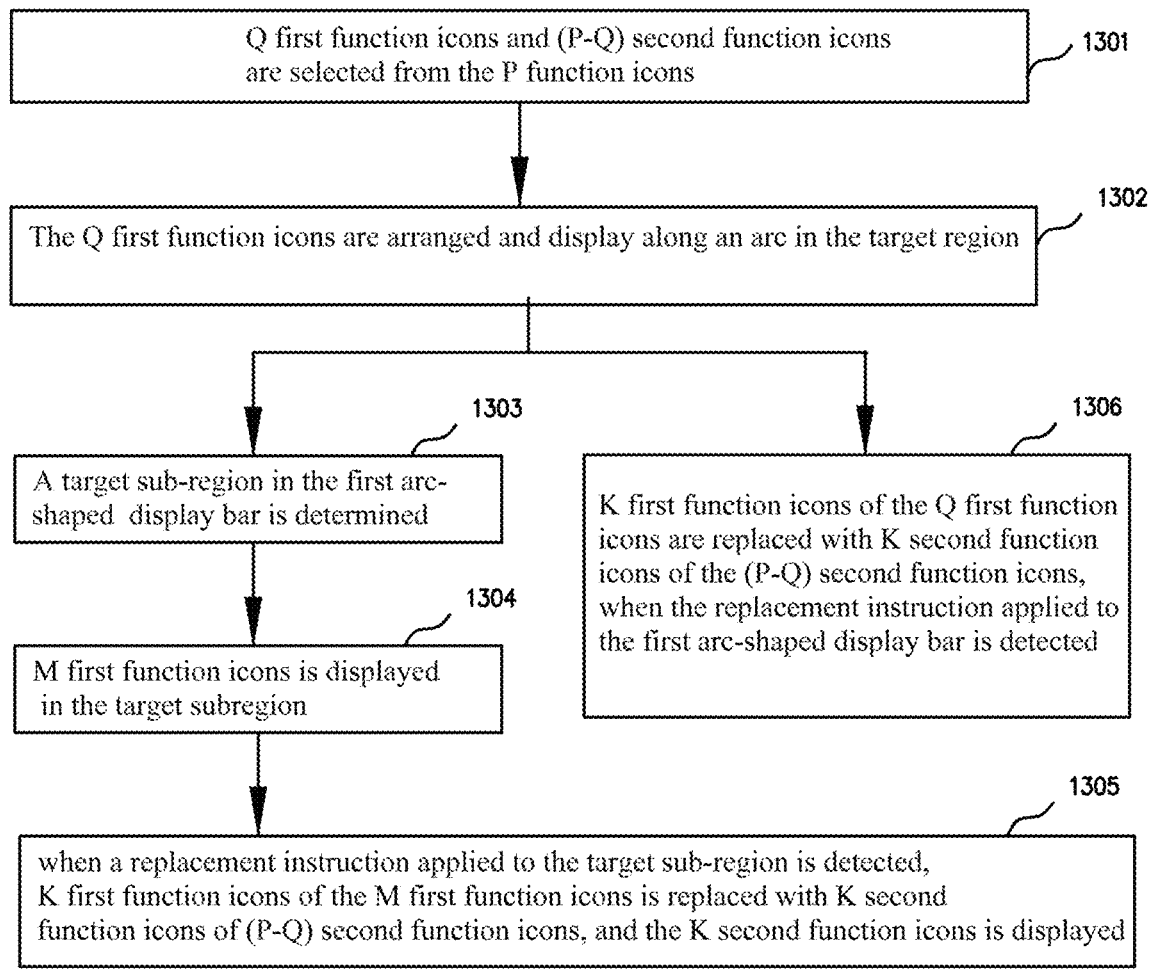
FIG. 13 illustrates a schematic flowchart of a method for displaying icons, in accordance with another embodiment of present disclosure.

As illustrated in FIG. 13, FIG. 13 illustrates a schematic flowchart of a method for displaying icons, in accordance with another embodiment of present disclosure. This method for displaying icons can be applied to the terminal illustrated above. In FIG. 13, the method for displaying icons may begin at block 1301.

At block 1301, Q first function icons and (P-Q) second function icons are selected from the P function icons.

At block 1302, the Q first function icons are arranged and display along an arc in the target region.

It should be noted that the operation in block 1301 is identical to the operation in block 810, and operation in block 1303 is identical to the operation in block 820, which will not be repeated here.

In a possible implementation manner, a first arc-shaped display bar is displayed in the target region. When the terminal displays the first arc-shaped display bar attached to the edge of the special-shaped screen or around the special-shaped notch region, an edge function icon may be displayed in the first arc-shaped display bar. The edge function icon is one of the (P-Q) second function icons. The edge function icon is divided into two portions, including a hidden portion and a visible portion, by the edge of the special-shaped screen. The visible portion is displayed in the first arc-shaped display bar. Alternatively, the hidden portion may be scrolled into the first arc-shaped display bar to be displayed when the terminal detects a sliding operation or a dragging operation from the visible portion toward the center of the screen.

It can be seen that displaying the edge function icon may remind the user that the first arc-shaped display bar can be scrolled to display other function icons, which may improve the display effect of the function icons and reduces the user's learning cost and operation difficulty.

Figure 14:
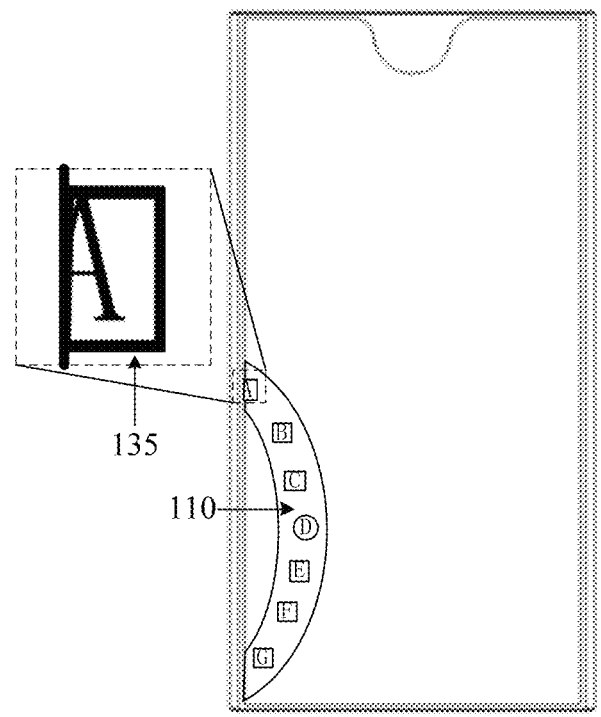
FIG. 14 illustrates a schematic view of an operation of displaying icon at an edge in the method of FIG. 13.

As illustrated in FIG. 14, FIG. 14 illustrates a schematic view of an operation of displaying icon at an edge in the method of FIG. 13. In FIG. 14, the function icons are displayed in the first arc-shaped display bar 110. The edge function icons 135 are displayed in the first arc-shaped display bar 110. The edge function icons 135 are divided into visible portion and the hidden portion, where the visible portion is visible in the first arc-shaped display bar 110.

In the embodiments of the present disclosure, block 1303, block 1304, and block 1305 may be performed, or block 1306 may be performed, after the terminal performs block 1301 and block 1302.

At block 1303, a target sub-region in the first arc-shaped display bar is determined.

In the embodiment of the present disclosure, the terminal may determine the target sub-region according to a configuration of the user. In another possible implementation manner, the terminal may also determine the target sub-region according to a default configuration.

Taking the first arc-shaped display bar 110 illustrated in FIG. 1 as an example, the terminal may determine the third sub-region 110c as the target sub-region according to the configuration of the user. The terminal may also determine the first sub-region 110a as the target sub-region according to default configuration.

At block 1304, M first function icons is displayed in the target subregion.

In this embodiment of the application, the terminal will display the M first function icons in the target sub-region. The target sub-region is one of the at least two sub-regions of the first arc-shaped display bar. M is a positive integer not less than K and not greater than Q.

At block 1305, when a replacement instruction applied to the target sub-region is detected, K first function icons of the M first function icons is replaced with K second function icons of (P-Q) second function icons, and the K second function icons is displayed.

In the embodiment of the present disclosure, K is not greater than the smaller one of M and (P-Q). When the terminal detects the replacement display command applied to the target sub-region, it can determine the value of K according to the replacement instruction. In a possible implementation manner, the replacement instruction may be generated according to a sliding operation. The sliding operation may be along tangent directions of an arc that defined by the first arc-shaped display bar. Alternatively, the terminal may determine the value of K according to a sliding displacement of the sliding operation on the touch screen. Exemplarily, the terminal may determine the value of K according to the corresponding relationship illustrated in Table 1.

TABLE I

| sliding displacement (cm) | (0, 1] | (1, 2] | (2, 3] |
|---|---|---|---|
| K | 1 | 2 | 3 |

The terminal can select the K first function icons that is to be replaced from the M first function icons according to a direction of the sliding operation after the terminal determines the value of K according to the sliding displacement of the sliding operation on the screen. The terminal then generates the replacement instruction correspondingly. The terminal may replace the K first function icons with K second function icons of the (P-Q) second function icons according to the replacement instruction.

In another possible implementation manner, the terminal will directly determine K as the smaller one of (P-Q) and M. Subsequently, when the terminal generates the replacement instruction when detects the sliding operation, and the M first function icons are directly replaced by the K second function icons according to the replacement instruction. Alternatively, the terminal may select the K second function icons that is used to replace the first function icons according to the direction in which the sliding operation slides on the screen. When the terminal detects that the direction of the sliding operation is in a first direction, the terminal replaces the M first function icons with K1 second function icons. When the terminal detects that the direction of the sliding operation is in a second direction, the terminal replaces the M first function icons with K2 second function icons. The first direction and the second direction are opposite. K1 is not greater than the smaller one of (P−Q) and M, and K2 is not greater than the smaller one of (P−Q) and M, and the sum of K1 and K2 is not greater than (P−Q). The K1 second function icon and the K2 second function icon are different.

For example, there are 3 (the value of M) first function icons and 5 (the value of (P−Q)) second function icons displayed in the target sub-region. The terminal may replace the 3 first function icons with 3 (the value of K1) second function icons when the terminal detects a sliding operation in the target sub-region along a downward direction. Alternatively, terminal may replace the 3 first function icons with 2 (the value of K2) second function icons when the terminal detects a sliding operation in the target sub-region along an upward direction.

Figure 15:
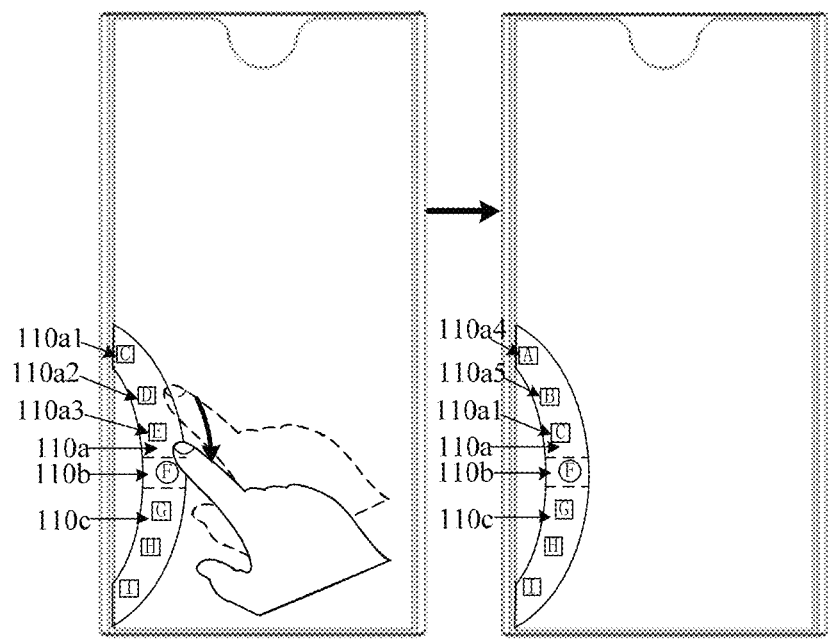
FIG. 15 illustrates a schematic view of replacing the first function icons with second function icons in the method of FIG. 13.

As illustrated in FIG. 15, FIG. 15 illustrates a schematic view of replacing and displaying the second function icon in the method of FIG. 13. In FIG. 15, the target sub-region is determined as the first sub-region 110a of the first arc-shaped display bar 110. The function icon 110a2 and function icon 110a3 in the first sub-region 110a may be scrolled out of the first sub-region 110a and hidden by the terminal when the terminal detects a sliding operation in the first sub-region 110a towards the third sub-region 110c. The function icon 110a1 is scrolled to a location in the first sub-region 110a that is adjacent to the second sub-region. A function icon 110a4 and a function icon 110a5 are displayed in an upper portion of the first sub-region 110a.

It can be seen that the embodiment of the present disclosure discloses a solution for scrolling icons indifferent regions.

At block 1306, K first function icons of the Q first function icons are replaced with K second function icons of the (P−Q) second function icons, when the replacement instruction applied to the first arc-shaped display bar is detected.

In the embodiment of the present disclosure, K is a positive integer, and K is not greater than the smaller one of Q and (P−Q). The replacement instruction may be an instruction generated according to a sliding operation. The sliding operation may be along the tangent directions of the arc defined by the first arc-shaped display bar.

Alternatively, the terminal may determine the value of K according to the sliding displacement of the sliding operation on the touch screen. Exemplarily, the terminal may determine the value of K according to a correspondence relationship illustrated in Table 2. Table 2 shows the correspondence relationship of the sliding displacement and the value of K.

TABLE II

| sliding displacement (cm) | (0, 1] | (1, 2] | (2, 3] | (3, 4] | (4, 5] | (5, 6] |
|---|---|---|---|---|---|---|
| K | 1 | 2 | 3 | 4 | 5 | 6 |

Figure 16:
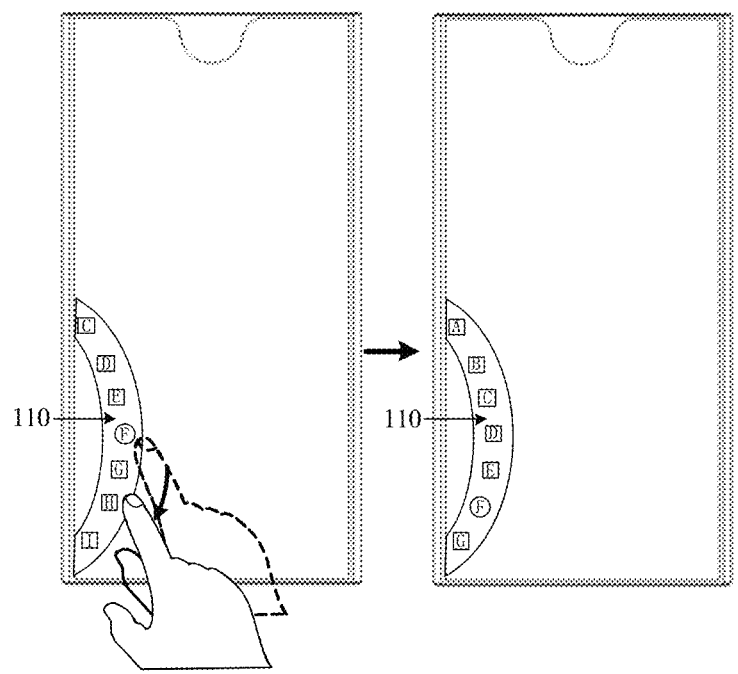
FIG. 16 illustrates another schematic view of replacing the first function icons with second function icons in the method of FIG. 13.

After the terminal determines the value of K according to the sliding displacement of the sliding operation on the screen, the terminal may select the K first function icons, which is to be replaced by the second function icons, from the Q first function icons according to the direction of the sliding operation, and then generate the replacement instruction accordingly. The terminal replaces the K first function icons with the K second function icons according to the replacement instruction. For example, as illustrated in FIG. 16, FIG. 16 illustrates another schematic view of replacing the first function icons with second function icons in the method of FIG. 13. In FIG. 16, the terminal the function icons displayed in the first arc-shaped display bar 110 may be scrolled down by the terminal when the terminal detects a sliding operation applied on the first arc-shaped display bar 110. In FIG. 16, the function icon H and the function icon I at the bottom are scrolled out of the first arc-shaped display bar 110, and the function icon A and the function icon B are scrolled into the upper portion of the first arc-shaped display bar 110, and displayed in the first arc-shaped display bar 110.

It should be noted that, in a possible implementation manner, the method provided in the embodiment of the present disclosure further includes the following operations. In the method, L locked icons is selected from the Q function icons, and L is an integer not greater than (Q−K). K first function icons of the Q first function icons are replaced with K second function icons of the (P−Q) second function icons when the replacement instruction applied to the first arc-shaped display bar is detected. In particular, K first function icons, which is selected from function icons of the Q first function icons excepting the locked icons, are replaced with K second function icons of the (P−Q) second function icons when the replacement instruction applied to the first arc-shaped display bar is detected.

Figure 17:
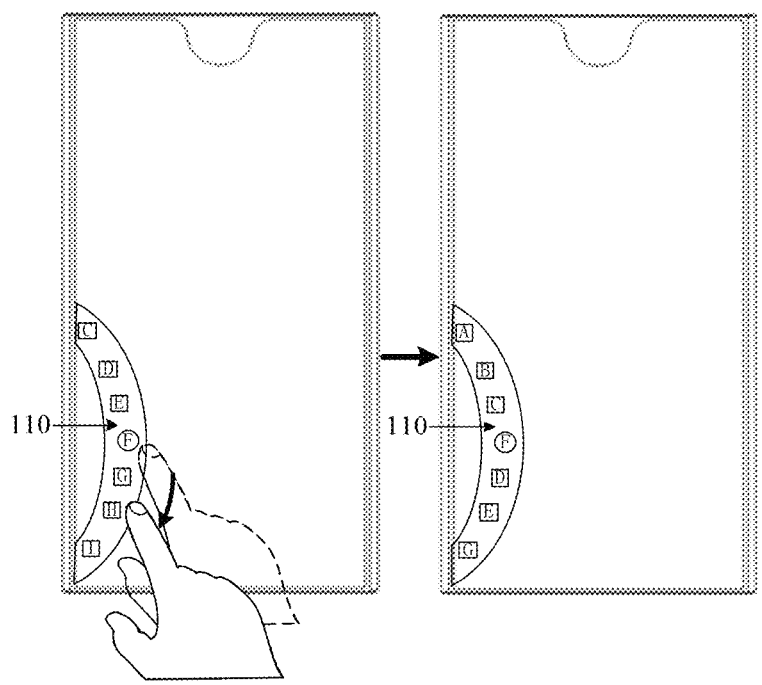
FIG. 17 illustrates a schematic view of replacing the first function icons with second function icons in a situation in which an icon is locked, in the method of FIG. 13.

In a possible implementation manner, as illustrated in FIG. 17, illustrates a schematic view of replacing the first function icons with second function icons in a situation in which at least one icon is locked, in the method of FIG. 13. In FIG. 17, the terminal determines the function icon F as the locked icon from seven displayed first function icons that include the function icon C, the function icon D, the function icon E, the function icon F, the function icon G, the function icon H, and the function icon I. The terminal may replace the two first function icons (the function icon H and the function icon I) of the seven first function icons with the function icons A and the function icon B when the terminal detects the replacement instruction applied to the first arc-shaped display bar 110. In particular, in the function icons of the first arc-shaped display bar 110, the location of the function icon F remains unchanged, and other icons may be scrolled to the lower portion of the first arc-shaped display bar 110. The function icon A and the function icon B may be scrolled into the upper portion of the first arc-shaped display bar 110, and the function icon H and the function icon I may be scrolled out of the lower portion of the first arc-shaped display bar 110.

In another possible implementation manner, the L locked icons is selected from the Q function icons. In particular, an attribute of each of the function icons of the Q function icons are obtained. L of the function icons with attributes indicating that the function icons should remain unchanged are determined as the locked function icons.

In another possible implementation manner, the method provided in the embodiment of the present disclosure further includes the following operations. In the method, the first arc-shaped display bar is divided into P sub-display-regions when P is an integer not greater than Q. The first function icons are displayed in the P sub-display-regions in one-to-one correspondence.

In another possible implementation manner, a central icon is determined when P is an integer not greater than Q. The central icon is an icon of an object that provides system customization functions, and belongs to the P function icons.

The system customization function is a function corresponding to the current foreground application of the terminal. The center icon is displayed at the center of the first arc-shaped display bar, and the remaining (P−1) function icons each included in the P function icons are displayed adjacent to the center icon.

It should be noted that, the remaining (P−1) function icons may be symmetrically distributed about the central icon when the value of P is an odd number. When the value of P is an even number, P/2 function icons of the remaining (P−1) function icons may be displayed on a side of the center icon opposite to gravitational direction, and (P/2−1) icons of the remaining (P−1) function icons may be on a side of the center icon points to gravity.

In summary, in the method for displaying icons according to the illustrated embodiment, the first arc-shaped display bar is displayed in a region attached to the edge of the special-shaped screen or surrounding the special-shaped notch region. Q first function icons each included in P function icons and (P−Q) second function icons are selected from the P function icons when there are P function icons. The target sub-region are determined in the first arc-shaped display bar. M first function icons are displayed in the target sub-region. The K first function icons of the M first function icons are replaced with K second function icons selected from the (P−Q) second function icons when a replacement instruction applied to the target sub-region is detected. Alternatively, K first function icons of the Q first function icons are replaced with K second function icons selected from the (P−Q) second function icons when a replacement instruction applied to the first arc-shaped display bar is detected. Because the method may be applied to the terminal with the special-shaped screen, the terminal can display the originally hidden function icons in the user interface for responding to the icon display instruction when there are too much function icons arranged in arc-shaped arrangement and displayed at the edge of the terminal screen. Operations for the user to find the specified application are simplified without occupying additional display region. Therefore, the function icons may be quickly displayed, while there is enough space in the user interface to display other contents.

A device for displaying icons is provided in the following, in accordance with embodiments of the present disclosure. The device can be configured to perform the method for displaying function icon according to the embodiments. For details not disclosed in the embodiments of the device, may be illustrated in the embodiments of the method, in accordance with the embodiments of present disclosure.

Figure 18:
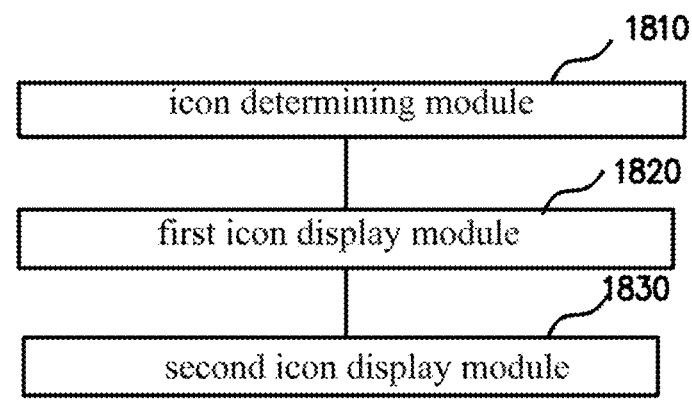
FIG. 18 illustrates a structural block diagram of a device for displaying icons, in accordance with an embodiment of the present disclosure.

As illustrated in FIG. 18, FIG. 18 illustrates a structural block diagram of a device for displaying icons, in accordance with an embodiment of the present disclosure. The device for displaying icons can be implemented as all or a part of the terminal via software, hardware or a combination of the two. The device includes an icon determining module 1810, a first icon display module 1820, and a second icon display module 1830.

The icon determining module 1810 is configured to select Q first function icons and (P−Q) second function icons from P function icons, where Q is a preset positive integer, and P is an integer greater than Q.

The first icon display module 1820 is configured to arrange the Q first function icons in an arc-shaped arrangement and display the Q first function icons in a first target region; the first target region being a display region attached to an edge of the special-shaped screen or surrounding the special-shaped notch region.

The second icon display module 1830 configured to display K second function icons in a current user interface when an icon display instruction applied to the first target region being detected, and K being an integer not greater than (P−Q).

In an alternative embodiment, the second icon display module 1830 is configured to arrange the K second function icons in an arc-shaped arrangement around the first target region, and display the K second function icons, when an expanded display instruction applied to the first target region is detected. K is an integer not greater than (P−Q).

In an alternative embodiment, the second icon display module 1830 is configured to determine a second target region and display the K second function in the second target region when an extended display instruction applied to the first target region is detected. The second target region is determined based on an edge of the first target region that is adjacent to a center of the special-shaped screen. The second target region is attached to the first target region.

In an alternative embodiment, the first target region includes at least two sub-regions. The second icon display module 1830 is configured to determine the second target region based on an edge of a target sub-region that is adjacent to the center of the screen when the extended display instruction applied to the target sub-region is detected. The target sub-region is one of the at least two sub-regions.

In an alternative embodiment, the second icon display module 1830 is configured to replace K first function icons of the Q first function icons with K second function icons of the (P−Q) second function icons when a replacement instruction applied to the first target region is detected. K is a positive integer, and K is not greater than the smaller one of Q and (P−Q).

In an alternative embodiment, the first icon display module 1820 is configured to display M first function icons in a target sub-region. The target subregion is one of the at least two sub-regions. M is a positive integer not less than K and not greater than Q. The second icon display module 1830 is configured to replace K first function icons of the M first function icons with K second function icons of the (P−Q) second function icons when a replacement instruction that applies to the target sub-region is detected.

In an alternative embodiment, the terminal further includes a third display module for displaying an edge function icon. The edge function icon is one of the (P−Q) second function icons. The edge function icon is divided into a visible portion and a hidden portion. The visible portion is displayed in the first target region.

In an alternative embodiment, the terminal further includes a determining module configured to selected L locked icons from the Q first function icons. L is an integer not greater than (Q−K). The second icon display module 1830 is configured to replace K first function icons, which is selected from function icons of the Q first function icons excepting the L locked icons, with K second function icons of the (P−Q) second function icons when the replacement instruction applied to the first target region is detected.

In an alternative embodiment, the first target region of the terminal is a first arc-shaped display bar.

Figure 19:
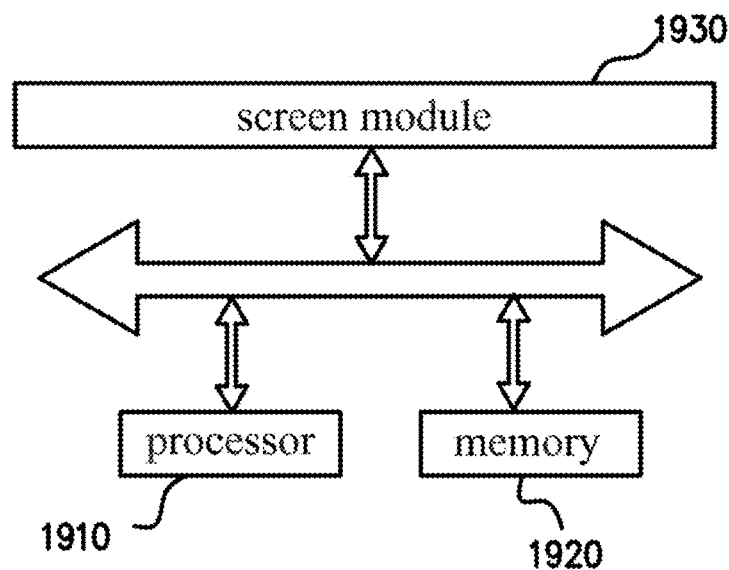
FIG. 19 illustrates a structural block diagram of a terminal, in accordance with an embodiment of the present disclosure.

As illustrated in FIG. 19, FIG. 19 illustrates a structural block diagram of a terminal, in accordance with an embodiment of the present disclosure. As illustrated in FIG. 19, the terminal includes a processor 1910, a memory 1920, and a screen module 1930. The memory 1920 stores at least one instructions. The instructions are loaded and executed by the processor 1910 to perform the method for displaying icons as described in the above embodiments.

As illustrated in FIG. 20, FIG. 20 illustrates till another terminal 1000, in accordance with one embodiment of the present disclosure. The terminal 1000 includes an outer frame 300 and a special-shaped screen 100 connected to the outer frame 300.

The outer frame 300 may include two first edges 321, 313, and two second edges 311, 312. Two first edges 321, 313 are substantially parallel to each other, and two second edges 311, 312 are substantially parallel to each other.

The special-shaped screen 100 may be a touch screen with an irregular shape, the irregular shape is not a rectangle or a rounded rectangle. In the illustrated embodiment, the special-shaped screen 100 includes a non-display portion 110 with a special shape and a display portion 130 attached to the non-display portion 110. The non-display portion 110 may defines a notch to accommodate at least one component of the front panel such as a camera, a distance sensor (also known as a proximity sensor), an earpiece, and an ambient light brightness sensor.

The display portion 130 may include concave sub-edge 320 and three straight sub-edges 310. The concave sub-edge 320 is attached to one of the first edges 321. Two of the three straight sub-edges 310 are connected to the concave sub-edge 320, and substantially parallel to each other. The two of the three straight sub-edges 310 are respectively attached to the two second edges 311, 312. The other of the three straight sub-edges 310 is attached to the first edges 313. The notch is defined in the concave sub-edge 320 therefore forming the concave sub-edge 320.

It should be noted that, in this embodiment, the non-display region 110 may be hollow (such as a notch, a though hole, a recess defined at the edge therefore forming the non-display region 110). The hollow non-display region 110 may be equivalent to the special-shaped notch region in the above-mention embodiments. Therefore the terminal 1000 in this embodiment may also be configured to perform the methods for displaying icons in the above embodiments without limitation.

In other embodiments, the non-display region 110 may filled with a certain components such as a lens, a glasses, displaying elements etc. In this situation, the special-shaped screen 100 may have a regular shape such as a rectangular forming by the special-shaped non-display portion 110 and the special-shaped display portion 130. It should be noted that, the non-display region 110 filled with other components may also be equivalent to the special-shaped notch region in the above-mention embodiments. Therefore the terminal 1000 in this embodiment may also be configured to perform the methods for displaying icons in the above embodiments without limitation.

As illustrated in FIG. 21, FIG. 21 illustrates till another method for displaying icons, in accordance with one embodiment of the present disclosure. In this embodiment, method may be applied to any one of the terminals in the above embodiments. The terminal also includes a processor, a memory coupled to the processor, and a special-shaped screen comprising a non-display portion with a special shape and a display portion attached to the non-display portion. The memory stores and at least one instruction, and the instruction is loaded and executed by the processor to perform the method for displaying icons. The method may begin at block 2010.

At block 2010, a first target region in the display portion is determined. The first target region is attached to an edge of the display portion or around the non-display portion. The first target region is in an arc shape extending along an arc.

At block 2020, a plurality of first function icons are displayed in the first target region along an extending direction of the first target region.

At block 2030, a plurality of second function icons is displayed in the display portion when an icon display instruction applied to the first target region is detected. The second function icons are different from the first function icons.

In some embodiments, a second target region in the display portion is determined when an extended display instruction applied to the first target region is detected. The second target region is attached to an edge of the first target region that is adjacent to a center of the display portion. The K second function icons are displayed in the second target region.

It should be understood that, the operations in this embodiment similar to corresponding operations in the above embodiments may be referred to the above embodiments.

The embodiment of the present disclosure also provides a computer-readable medium. The computer-readable medium stores at least one instruction. The at least one instruction is loaded and executed by the processor to perform the method for displaying icons described in each of the above embodiments.

The embodiments of the present disclosure also provide a computer program product that stores at least one instruction. The at least one instruction is loaded and executed by the processor to perform the method for displaying icons described in each of the above embodiments.

It should be noted that when the device for displaying icons provided in the above embodiments executes the method for displaying icons, the division of the above functional modules is only used as an example for describing. In actual applications, the above functions can be allocated to different functions according to different requirements. In other words, internal structure of the device may be divided into different functional modules to complete all or part of the functions described above. In addition, the device for displaying icons provided by the above-mentioned embodiments belongs to the same concept as the embodiments of the method for displaying icons. For the specific implementation process, as illustrated in the method embodiments, which will not be repeated here.

The serial numbers of the above embodiments of the present disclosure are only for description, and do not represent the advantages and disadvantages of the embodiments.

Those of ordinary skill in the art can understand that all or part of the steps in the above embodiments can be implemented by hardware, or by a program instructing related hardware to complete. The program can be stored in a computer-readable storage medium. The storage medium above-mentioned can be a read-only memory, a magnetic disk or an optical disk, etc.

The above-mentioned embodiments are merely illustrative of several embodiments of the present disclosure, and the description thereof is more specific and detailed, however is not to be construed as limiting the scope of the present disclosure. It should be noted that various variations and modifications may be made by those skilled in the art without departing from the spirit and scope of the present disclosure.

What is claimed is:

1. A method for displaying icons, applied to a terminal comprising a special-shaped screen, the special-shaped screen comprising a non-display portion with a special shape and a display portion attached to the non-display portion; the method comprising:
   selecting Q first function icons and (P–Q) second function icons from P function icons, where Q is a preset positive integer, and P is an integer greater than Q;
   arranging and displaying the Q first function icons along an arc in a first target region of the display portion, wherein the first target region is a display region that is adjacent to an edge of the special-shaped screen or surrounding the non-display portion of the special-shaped screen; and
   displaying K second function icons in the display portion when an icon display instruction applied to the first target region is detected, where K is an integer not greater than (P–Q);
   wherein the special-shaped screen defines a special-shaped notch region in the non-display portion, the special-shaped screen comprises at least a concave sub-edge, the concave sub-edge is attached to an edge of an outer frame of the terminal, and the special-shaped notch region is defined cooperatively by the concave sub-edge and the edge of the outer frame of the terminal; and
   wherein the displaying K second function icons in the display portion when an icon display instruction applied to the first target region is detected, comprises:
      selecting L locked icons from the Q first function icons, and replacing K first function icons, which are selected from the Q first function icons excepting the L locked icons, with K second function icons of the (P–Q) second function icons, when a replacement instruction applied to the first target region is detected, where K is a positive integer not greater than a smaller one of Q and (P–Q), and L is an integer not greater than (Q–K).

2. The method of claim 1, wherein the displaying K second function icons in the display portion when an icon display instruction applied to the first target region is detected, further comprises:
   arranging and displaying K second function icons along an arc around the first target region, and displaying the K second function icons, when an extended display instruction applied to the first target region is detected.

3. The method of claim 2, wherein the arranging and displaying K second function icons along an arc around the first target region and displaying the K second function icons, comprises:
   determining a second target region in the display portion, the second target region being attached to an edge of the first target region that is adjacent to a center of the special-shaped screen; and
   displaying the K second function icons in the second target region.

4. The method of claim 3, wherein the first target region includes at least two sub-regions, and the determining a second target region in the display portion, the second target region being attached to an edge of the first target region that is adjacent to a center of the special-shaped screen, comprises:
   determining the second target region in the display portion based on an edge of a target sub-region that is adjacent to the center of the special-shaped screen, the target sub-region being one of the at least two sub-regions.

5. The method of claim 1, further comprising: displaying an edge function icon;
   wherein the edge function icon is one of the (P–Q) second function icons; the edge function icon is divided into a visible portion and a hidden portion by an edge of the display portion; and the visible portion is displayed in the first target region.

6. The method of claim 5, further comprising:
   scrolling the hidden portion into the first target region to be displayed when detecting a dragging operation from the visible portion toward a center of the special-shaped screen.

7. The method of claim 1, wherein the selecting L locked icons from the Q first function icons, comprises:
   obtaining an attribute of each of the Q function icons;
   selecting L function icons whose attributes indicate that the function icons should remain unchanged in the first target region; and
   determining the selected L function icons as the locked function icons.

8. The method of claim 1, wherein the replacement instruction is generated according to a sliding operation acting on the display portion; and a value of K is determined basing on a sliding displacement of the sliding operation.

9. The method of claim 8, wherein the replacing K first function icons, which are selected from the Q first function icons excepting the L locked icons, with K second function icons of the (P–Q) second function icons, comprises:
   scrolling the K first function icons, which are selected from the Q first function icons excepting the L locked icons, out of the first target region from an end of the first target region; and
   scrolling the K second function icons of the (P–Q) second function icons into the first target region from another end of the first target region.

10. The method of claim 8, wherein the replacing K first function icons, which are selected from the Q first function icons excepting the L locked icons, with K second function icons of the (P–Q) second function icons, comprises:
    selecting K first function icons from the Q first function icon excepting the L locked icons, according to a direction of the sliding operation; and
    replacing the K first function icons, selected from the Q first function icons excepting the L locked icons, with K second function icons of the (P–Q) second function icons.

11. The method of claim 8, wherein the replacing K first function icons, which are selected from the Q first function icons excepting the L locked icons, with K second function icons of the (P–Q) second function icons, comprises:
    selecting K second function icons from the (P–Q) second function icons according to a direction of the sliding operation; and
    replacing the K first function icons, which are selected from the Q first function icons excepting the L locked icons, with the selected K second function icons of the (P–Q) second function icons.

12. The method of claim 11, wherein:
    the selecting K second function icons from the (P–Q) second function icons according to a direction of the sliding operation, comprises:
    selecting K1 second function icons from the (P–Q) second function icons when the sliding operation slides in a first direction; and selecting K2 second function icons from the (P−Q) second function icons when the sliding operation slides in a second direction; wherein the second direction is opposite to the first direction; each one of the K1 second function icons is different from all of the K2 second function icons; and a sum of K1 and K2 is less than (P−Q).

13. The method of claim 1, wherein:
the selecting Q first function icons and (P−Q) second function icons from P function icons comprises: determining first Q function icons of P function icons as the Q first function icons, and determining a (Q+1)th function icon to a Pth function icon of the P function icons as the (P−Q) second function icons, according to an order of the P function icons in the terminal.

14. The method of claim 13, wherein:
the order is an order of times that the function icons have been involved in history; or
the order is a sequence of time intervals between last times that the function icons were involved and a present moment of the terminal.

15. The method of claim 1, wherein the first target region is a first arc-shaped display bar.

16. The method of claim 1, wherein the concave sub-edge is an edge with a semicircular notch, an edge with an arc-shaped notch, an edge with a rectangular notch, or an edge with a triangular notch.

17. The method of claim 1, further comprising:
triggering the first target region when the terminal is in a horizontal display state; or
triggering the first target region when the terminal is in a vertical display state.

18. A terminal, comprising a screen, a processor and a memory; wherein the memory stores instructions, and the instructions are loaded and executed by the processor to perform a method for displaying icons, the method for displaying icons comprises:
selecting Q first function icons and (P−Q) second function icons from P function icons, where Q is a preset positive integer, and P is an integer greater than Q;
arranging and displaying the Q first function icons along an arc in a first target region of a display portion of the screen, wherein the first target region is a display region that is adjacent to an edge of the screen or surrounding a non-display portion of the screen; and
selecting L locked icons from the Q first function icons, and replacing K first function icons, which are selected from the Q first function icons excepting the L locked icons, with K second function icons of the (P−Q) second function icons, when a replacement instruction applied to the first target region is detected, where K is a positive integer not greater than a smaller one of Q and (P−Q), and L is an integer not greater than (Q−K).

19. A terminal, comprising:
a processor;
a memory coupled to the processor; and
a special-shaped screen comprising a non-display portion with a special shape and a display portion attached to the non-display portion, the special-shaped screen defines a special-shaped notch region in the non-display portion, the special-shaped screen comprises at least a concave sub-edge, the concave sub-edge is attached to an edge of an outer frame of the terminal, and the special-shaped notch region is defined cooperatively by the concave sub-edge and the edge of the outer frame of the terminal;
wherein the memory stores instructions, the instructions being executable by the processor to perform a method for displaying icons, the method for displaying icons comprises:
defining a first target region in the display portion, wherein the first target region is attached to an edge of the display portion or around the non-display portion, and the first target region is in an arc shape extending along an arc and comprises at least two sub-regions;
selecting Q first function icons and (P−Q) second function icons from P function icons, where Q is a preset positive integer, and P is an integer greater than Q;
displaying, in a target sub-region, M first function icons selected from the Q first function icons, the target sub-region being one of the at least two sub-regions, and M being a positive integer not greater than Q;
displaying other first function icons of the Q first function icons in other sub-regions of the at least two sub-regions; and
replacing K first function icons of the M first function icons displayed in the target sub-region with K second function icons of the (P−Q) second function icons, and keeping the other first function icons displayed in the other sub-regions unchanged, when a replacement instruction applied to the target sub-region is detected, where K is an integer not greater than M.

20. The terminal of claim 19, wherein the method further comprises:
individually displaying the at least two sub-regions in the display portion in response to a corresponding trigger gesture.

* * * * *